US011871189B2

(12) United States Patent
Maes et al.

(10) Patent No.: US 11,871,189 B2
(45) Date of Patent: Jan. 9, 2024

(54) METHOD AND A CONTROLLER FOR CONFIGURING A DISTRIBUTED MICROPHONE SYSTEM

(71) Applicant: SIGNIFY HOLDING B.V., Eindhoven (NL)

(72) Inventors: Jerome Eduard Maes, Eindhoven (NL); Bartel Marinus Van De Sluis, Eindhoven (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 67 days.

(21) Appl. No.: 17/278,031

(22) PCT Filed: Sep. 3, 2019

(86) PCT No.: PCT/EP2019/073455
§ 371 (c)(1),
(2) Date: Mar. 19, 2021

(87) PCT Pub. No.: WO2020/057963
PCT Pub. Date: Mar. 26, 2020

(65) Prior Publication Data
US 2021/0385574 A1   Dec. 9, 2021

(30) Foreign Application Priority Data
Sep. 20, 2018 (EP) ..................... 18195620

(51) Int. Cl.
*H04R 3/00* (2006.01)
*G10L 25/51* (2013.01)
*H04R 1/40* (2006.01)

(52) U.S. Cl.
CPC .............. *H04R 3/005* (2013.01); *G10L 25/51* (2013.01); *H04R 1/406* (2013.01)

(58) Field of Classification Search
CPC .......... H04R 3/005; H04R 1/406; G10L 25/51
(Continued)

(56) References Cited

U.S. PATENT DOCUMENTS

| 9,441,847 B2 | 9/2016 | Grohman |
| 9,619,985 B2 | 4/2017 | Stricker et al. |

(Continued)

FOREIGN PATENT DOCUMENTS

| EP | 0932142 A2 | 7/1999 |
| JP | 2002232576 A | 8/2002 |

(Continued)

*Primary Examiner* — William A Jerez Lora

(57) ABSTRACT

A method (400) for configuring a distributed microphone system is disclosed. The distributed microphone system comprises a plurality of microphone devices connected via a network. The method (400) comprises: analyzing (402) first historical audio data (112) received from a first microphone device (110) of the plurality of microphone devices, analyzing (404) second historical audio data (122) received from a second microphone device (120) of the plurality of microphone devices, comparing (406) the first historical audio data (112) to the second historical audio data (122) to identify (408) differences between the first historical audio data (112) and the second historical audio data (122), and assigning (410) a priority level to the first and/or second microphone device based on the differences between the first historical audio data (112) and the second historical audio data (122), wherein the priority level is indicative of a priority rule for analyzing future audio data recorded by the first and/or second microphone device, respectively, and/or wherein the priority level is indicative of a communication rule for communicating future audio data from the first and/or second microphone device, respectively, via the network.

13 Claims, 4 Drawing Sheets

(58) Field of Classification Search
USPC .................. 381/56, 58, 91, 92, 122, 123
See application file for complete search history.

(56) References Cited

U.S. PATENT DOCUMENTS

| | | |
|---|---|---|
| 2003/0138119 A1 | 7/2003 | Pocino et al. |
| 2008/0055101 A1* | 3/2008 | Chung ............. G08B 13/19608 |
| | | 348/42 |
| 2015/0189068 A1 | 7/2015 | Mohan et al. |
| 2016/0071526 A1 | 3/2016 | Wingate et al. |
| 2016/0360332 A1 | 12/2016 | Shin et al. |
| 2018/0177029 A1* | 6/2018 | Wang ..................... G06F 3/167 |
| 2018/0330589 A1* | 11/2018 | Horling ................ H05B 47/125 |

FOREIGN PATENT DOCUMENTS

| | | |
|---|---|---|
| JP | 2006211504 A | 8/2006 |
| JP | 2007158526 A | 6/2007 |
| JP | 2008301124 A | 12/2008 |
| JP | 2016046720 A | 4/2016 |
| JP | 2016189532 A | 11/2016 |
| WO | 2017138934 A1 | 8/2017 |

* cited by examiner

400

METHOD AND A CONTROLLER FOR CONFIGURING A DISTRIBUTED MICROPHONE SYSTEM

CROSS-REFERENCE TO PRIOR APPLICATIONS

This application is the U.S. National Phase application under 35 U.S.C. § 371 of International Application No. PCT/EP2019/073455, filed on Sep. 3, 2019, which claims the benefit of European Patent Application No. 18195620.2, filed on Sep. 20, 2018. These applications are hereby incorporated by reference herein.

FIELD OF THE INVENTION

The invention relates to a method for configuring a distributed microphone system, and to a computer program product for executing the method. The invention further relates to a controller for configuring a distributed microphone system.

BACKGROUND

Smart speakers and voice-controlled systems are well known in the home domain. These systems comprise one or more microphone devices (e.g. smart speakers) that listen for audio input from users. Such a system enables a user to control devices by providing spoken control commands, or to ask questions, whereupon the system may respond with an answer. If this system comprises two microphone devices connected via a network, a user command (e.g. "turn on the lights" or "what is the weather forecast" or "how to boil an egg") may be picked up by two or more of these devices. The system then determines the sound intensity of the user command/question at both microphone devices, and the system selects a microphone device at which the sound intensity was highest to execute the control command or respond to the question. If such a system comprises multiple microphone devices, the amount of data communicated via the network and the required computing resources significantly increase.

SUMMARY OF THE INVENTION

The inventors have realized that as the number of microphone devices (e.g. microphones distributed throughout an (home/office/outdoor) space) increases, the amount of network traffic and computing resources increases as well. Thus, in order to scale-up a voice-controlled system to for example an office or outdoor environment, additional measures are required to reduce the amount of network traffic and/or computing resources for communication and/or processing of the audio data. It is therefore an object of the present invention to provide a distributed microphone system that can handle large amounts of audio data from different microphone devices.

According to a first aspect of the present invention, the object is achieved by a method for configuring a distributed microphone system comprising a plurality of microphone devices connected via a network, the method comprising:
 analyzing first historical audio data received from a first microphone device of the plurality of microphone devices,
 analyzing second historical audio data received from a second microphone device of the plurality of microphone devices,
 comparing the first historical audio data to the second historical audio data to identify differences between the first historical audio data and the second historical audio data, and
 assigning a priority level to the first and/or second microphone device based on the differences between the first historical audio data and the second historical audio data, wherein the priority level is indicative of a priority rule for analyzing future audio data recorded by the first and/or second microphone device, respectively, and/or wherein the priority level is indicative of a communication rule for communicating future audio data from the first and/or second microphone device, respectively, via the network.

The inventors have realized that by analyzing historical audio data received from multiple microphone devices, prior usage of the microphone devices—or at least the relevant prior usage of these microphone devices—can be determined. Based on this (relevant) usage, the microphone devices are prioritized to reduce the amount of network traffic and/or computing resources for analyzing the audio data.

First, the historical audio data from a plurality of microphone devices is obtained. The historical audio data may be stored locally (e.g. in a central controller, in the microphone devices, in a local memory, etc.), or it may be stored remotely and be accessible via, for example, the internet. After the historical audio data from a plurality of microphone devices has been analyzed, differences between the historical audio data from the microphone devices are determined. Based on these differences, priority levels are assigned to the first and/or the second microphone device (and therewith to future audio data from the first and/or second microphone devices). By assigning these priority levels, a microphone device may have a higher priority level/priority value compared to another. Thus, after assigning the priority levels, future audio data from the microphones is handled by the distributed microphone system based on the priority level. The priority level may be defined as one or more rules that comprise instructions for handling the future audio data of the respective microphone device. The priority level may be indicative of a priority rule for analyzing future audio data recorded by a microphone device based on differences between the historical audio data of that microphone device compared to the historical audio data of another microphone device. This could, for example, result in that the (future) audio data of a first microphone device will be processed before (future) audio data of another microphone device, or that more processing resources are dedicated to the (future) audio data of the first microphone device. Additionally or alternatively, the priority level may be indicative of a communication rule for communicating future audio data recorded by a microphone device based on differences between the historical audio data of that microphone device compared to the historical audio data of another microphone device. This is beneficial, because the computing resources required for processing the audio data from the plurality of microphone devices is optimized and/or reduced. This could, for example, result in that the (future) audio data of a first microphone device is communicated via the network before (future) audio data of another microphone device is communicated via the network, or that certain audio data is communicated via the network in a limited form, or even not at all. This is beneficial, because the network resources/network traffic required for communicating the audio data from the plurality of microphone devices is reduced.

The communication rule may define an allowed number, frequency, latency, quality and/or size of audio data to be communicated from the respective microphone device via the network. The communication rule may limit the amount of future audio data shared via the network. This limitation may be realized by restricting the audio data sharing rules for a microphone device, for example by reducing the number and/or quality/size of audio data. This may include controlling the way that the audio data is to be shared. This may, for instance, include instructions for the microphone device to indicate that the microphone device should process the audio data locally, and only share information about the audio data (e.g. a text transcript of a conversation or context related information such as a person coughing, screaming, talking, etc.) This is beneficial, because the network resources required for communicating the audio data from the plurality of microphone devices is reduced.

The method may further comprise communicating the communication rule to the first and/or the second microphone device, respectively. In embodiments, wherein the method is executed by for example a central controller of the distributed network system, the central controller may communicate the communication rule to the respective microphone devices to provide instructions for communicating future audio data from the first and/or second microphone device. The communication rule may for example limit the amount of future audio data shared via the network. This is beneficial, because the network resources/network traffic required for communicating the audio data from the plurality of microphone devices to the central controller is reduced.

The step of analyzing the first historical audio data may comprise analyzing the first historical audio data to identify different types of audio in the first historical audio data. The step of analyzing the second historical audio data may comprise analyzing the second historical audio data to identify different types of audio in the second historical audio data. The method may further comprise classifying different types of audio of the first historical audio data into a first set of one or more audio classes and classifying different types of audio of the second historical audio data into a second set of one or more audio classes. The assigning of the priority level to the first and/or second microphone device may be further based on the first set of audio classes and the second set of audio classes, respectively. The audio classes may for example comprise background noise, non-speech audio generated by (building/outdoor) infrastructure, non-speech audio generated by a user, background speech, voice commands for controlling voice-controlled devices, voice commands for requesting voice-controlled services, and/or wake words for triggering voice-operated systems, assistants or services. This is enables distinguishing between different types of audio detected at different microphone devices, and prioritizing the microphone devices based thereon. For instance, when a first microphone device mainly recorded background noise, and a second microphone device mainly recorded speech from users, the second microphone may be assigned a higher priority level.

The step of analyzing the first historical audio data may comprise analyzing the first historical audio data to identify a first level of user presence at the first microphone device. The step of analyzing the second historical audio data may comprise analyzing the second historical audio data to identify a second level of user presence at the second microphone device. The assigning of the priority level to the first and/or second microphone device may be further based on the first and second levels of user presence. The levels of historical user presence may be determined by analyzing the historical audio data to recognize sounds associated with a user, such as user-generated sounds (e.g. footstep sounds, voices, etc.) or sounds generated by a personal user device (e.g. ringtones, vibrations, rendered audio content). If, for example, the user presence at a first microphone device is higher than the user presence at a second microphone device, the first microphone device may be assigned a higher priority level than the second microphone device. It is beneficial to determine the priority level based on the historical user presence at the microphone devices, because it reduces the amount of network resources and/or computing resources for audio data where less people have been (and likely will be) present.

The method may further comprise:
determining one or more locations of one or more users relative to the first, second and a third microphone device based on the first, second and third historical audio data, and
assigning the priority level to the first, second and/or third microphone device further based on the locations of the users relative to the first, second and third microphone devices.

In other words, the priority levels may be further determined based on where the users are located in the area. The historical locations of the users relative to the first, second and third microphones may be compared and used to determine the intensity of sounds associated with a user to determine the distance and direction of users relative to the microphones to determine the exact locations of users (e.g. by using trilateration). It is beneficial to determine the priority level based on the historical user locations at the microphone devices, because it reduces the amount of network resources and/or computing resources for audio data where less people have been (and likely will be) present.

The method may further comprise:
determining one or more trajectories of one or more users over time relative to the first, second and third microphone devices based on the locations of the one or more users over time,
assigning the priority level to the first, second and/or third microphone device further based on the one or more trajectories of the one or more users. The trajectory may be determined by determining a position of a user over time. The audio data of the plurality of microphones may be analyzed to identify similar sounds (e.g. footsteps, a user's voice, etc.) to determine that they originate from the same user. By applying trilateration to these audio fragments, a position of the user can be determined at a moment in time. If this position changes over time, it is indicative of that the user is moving. This enables detection of the trajectory (and the speed) of a user. The trajectories of multiple users may be detected over the period of time during which the historical audio data has been recorded. The trajectory (and the speed) may be used to determine the priority levels for the microphone devices. Microphone devices located at a location/path not often traversed by one or more users may, for example, be assigned lower priority levels than microphone devices located at a location/path that has been traversed by one or more users.

The method may further comprise:
obtaining locations of the first and second microphone devices, and
assigning the priority level to the first and/or second microphone device further based on the respective locations of the first and second microphone devices. The locations of the first and second microphone devices may, for example, be predefined, or information about the locations may be received from an (indoor/outdoor) positioning system. The locations may be retrieved from a (remote) memory. Assigning the priority levels based on the locations of the microphone devices is beneficial, because some microphone devices may be located at locations where it is more likely that user-generated audio is detected compared to other locations.

The step of analyzing the first historical audio data may comprise analyzing the first historical audio data to identify one or more first user activities based on the first historical audio data. The step of analyzing the second historical audio data may comprise analyzing the second historical audio data to identify one or more second user activities based on the second historical audio data. The assigning of the priority level to the first and/or second microphone device may be further based on the one or more first user activities and the one or more second user activities. The historical user activities may be derived from the historical audio data by analyzing the audio data for audio fragments indicative of user activities, whereupon the priority levels are assigned based on the identified activities at the respective microphone devices. It is beneficial to determine the priority level based on the user activities at the microphone devices, because for certain user activities audio data analysis may not be required.

The method may further comprise:
receiving a presence signal from a presence sensor associated with the first and/or the second microphone device, and
adjusting the priority level of the first and/or the second microphone device, respectively, in response to the presence signal. The presence sensor may be located in proximity of one or more microphone devices, and the priority level of the microphone devices may be adjusted/overruled when the presence sensor is triggered by a user. The adjusted priority level may be active during a predetermined period of time (e.g. a minute, 15 minutes, an hour, a day, etc.), or the adjustment may be active (only) when presence is detected. The method may further comprise: reverting to a previous priority level after a predetermined period of time and/or when presence is no longer detected by the presence sensor. For instance, if a microphone device has a low priority level, and a presence sensor associated with that microphone device is triggered, the priority level may be increased. This is beneficial because it saves network resources and/or computing resources when no user is present, and the functionality of the system is increased when a user is present.

The method may further comprise:
receiving an indication of a network capacity of the network, and
adjusting the priority level of the first and/or the second microphone device based on the network capacity of the network. The network capacity (e.g. the available bandwidth) may change based on a current amount of network traffic. It may be beneficial to adjust the priority levels based on a (current) network capacity to create a balance between network resources/computing resources and functionality of the distributed microphone system.

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a controller for configuring a distributed microphone system comprising a plurality of microphone devices connected via a network, the controller comprising:
a communication module configured to receive first historical audio data from a first microphone device of the plurality of microphone devices, and to receive second historical audio data from a second microphone device of the plurality of microphone devices, and
a processor configured to analyze the first historical audio data, analyze second historical audio data, compare the first historical audio data to the second historical audio data to identify differences between the first historical audio data and the second historical audio data, and assign a priority level to the first and/or second microphone device based on the differences between the first historical audio data and the second historical audio data, wherein the priority level is indicative of a priority rule for analyzing future audio data recorded by the first and/or second microphone device, respectively, and/or wherein the priority level is indicative of a communication rule for communicating future audio data from the first and/or second microphone device, respectively, via the network.

The controller may be comprised in the first microphone device, and the communication module may be configured to receive the first historical audio data from a microphone comprised in the first microphone device. This enables the first microphone device to determine its own (and/or the second microphone device's) priority level based on the differences between the historical audio data of both microphone devices. This is beneficial because no central controller is required for determining the priority level(s). Alternatively, the controller may be comprised in a central controller of a distributed microphone system.

According to a fourth aspect of the present invention, the object is achieved by a system comprising:
a central controller comprising the above-mentioned controller,
the first microphone device configured to communicate the first historical audio data to the central controller, and
the second microphone device configured to communicate the second historical audio data to the central controller.

The system may be a lighting system comprising the central controller, and the microphone devices may be comprised in lighting devices/fixtures of the lighting system. Integrating the microphone devices in the lighting system is beneficial, because lighting fixtures of the lighting system are often distributed equally throughout the (office/outdoor) space, which provides good coverage for sound detection. Additionally, the lighting devices may provide power connections for the microphone devices.

It should be understood that the computer program product, the controller and the system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which:

FIG. 3*c* shows schematically a heat map of a second type of historical audio data of the distributed microphone system of FIG. 3*a.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
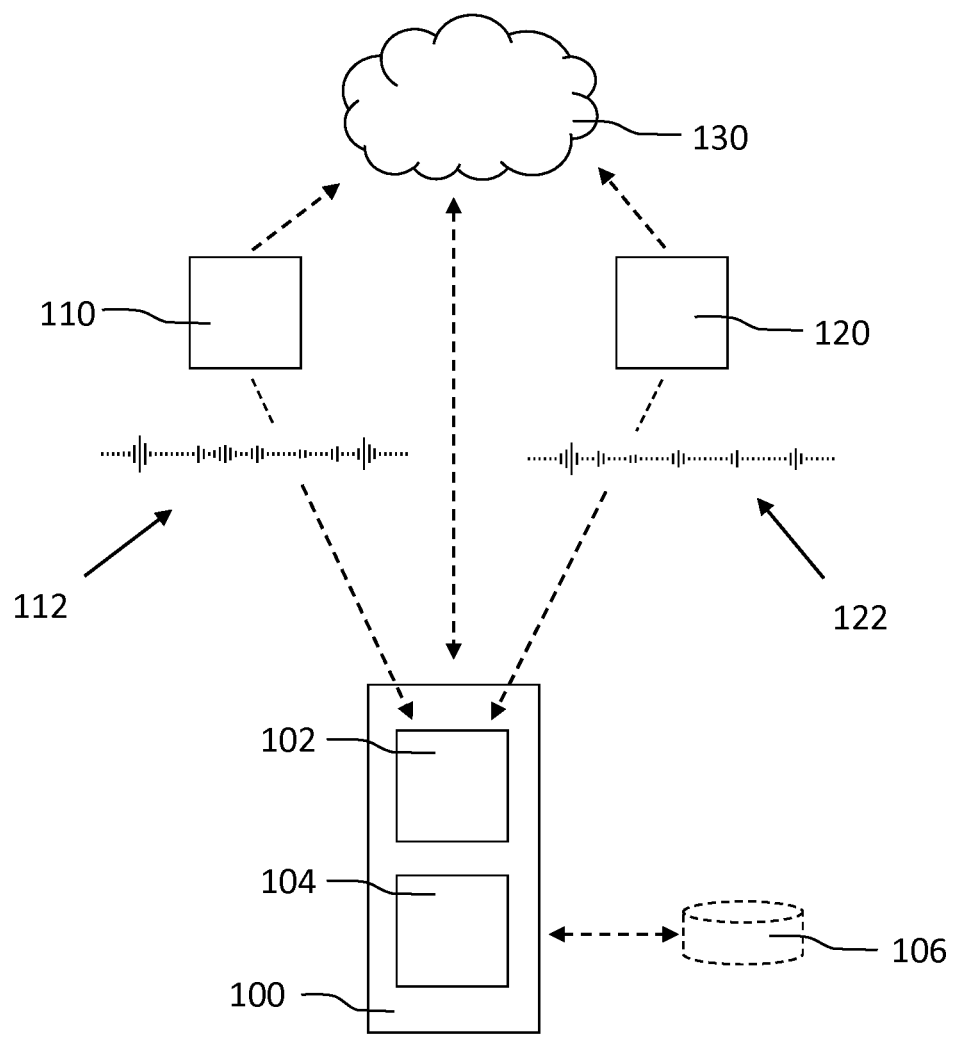
FIG. 1 shows schematically an embodiment of a distributed microphone system comprising a plurality of microphone devices and a controller for configuring the microphone devices.

FIG. 1 shows schematically an embodiment of a distributed microphone system comprising a plurality of microphone devices 110, 120 and a controller 100 for configuring the microphone devices 110, 120. The controller 100 comprises a communication module 102 configured to receive first historical audio data 112 from a first microphone device 110 and second historical audio data 122 from a second microphone device 120. The controller further comprises a processor 104 configured to analyze the first historical audio data 112 and to analyze the second historical audio data 122. The processor 104 is further configured to compare the first historical audio data 112 to the second historical audio data 122 to identify differences between the first historical audio data 112 and the second historical audio data 122. The processor 104 is further configured to assign a priority level to the first microphone device 110 and/or a (different) priority level to the second microphone device 120 based on the differences. The priority level is indicative of a priority rule for analyzing future audio data recorded by the first and/or second microphone device, respectively. Additionally or alternatively, the priority level is indicative of a communication rule for communicating future audio data from the first and/or second microphone device, respectively, via the network.

The controller 100 may be comprised in a central controller of the distributed microphone system (see FIG. 1), which is configured to receive audio data from the plurality of microphone devices 110, 120 of the distributed microphone system. Alternatively, the controller 100 may be comprised in a microphone device 110 (see FIG. 2, which is discussed below) of the distributed microphone system.

The distributed microphone system may comprise a plurality of microphone devices that are distributed throughout a space (e.g. a home, an office, an outdoor environment, etc.). Each microphone device comprises at least a microphone and a communication module for communicating audio data via the network. The audio data may be communicated directly or indirectly to a central controller (see FIG. 1) and/or to another microphone device in the network (see FIG. 2). The number of microphone devices (at least two, three, ten, etc.) of the distributed microphone system may be dependent on the system requirements. For instance, an (open) office space or an outdoor space may comprise an array of microphone devices, which may for example be integrated in luminaires or lamp posts and may be part of a lighting system. The audio data from the microphones may for example be used to control the lighting devices of the lighting system.

The communication module 102 of the controller 100 is configured to receive historical audio data from the first microphone device 110 and the second microphone device 120. The historical audio data comprises audio data that has been recorded and stored over a period of time (e.g. a day, a week, a month, etc.). The communication module 102 may receive audio data directly from the microphone devices 110, 120 via the network (e.g. via ZigBee, Bluetooth, Thread, Ethernet, PLC, Wi-Fi, etc.) and store the audio data in a memory 106 over the period of time to generate the historical audio data of the microphone devices 110, 120. The memory 106 may be comprised in the controller 100, or be located remotely from the controller 100 and be accessible via a network. Additionally or alternatively, the microphone devices may comprise memories for storing their respective audio data over the period of time to generate the historical audio data. Communication modules of the microphone devices may share the historical audio data (e.g. upon request by the controller 100) directly or indirectly (e.g. via a server 130). Additionally or alternatively, the microphone devices may be configured to communicate/stream audio data to a server 130 over the period of time, and the historical audio data may be stored on the server 130 and later (e.g. upon request) communicated to the controller 100. It should be understood that the above-mentioned examples of obtaining the historical audio data of the microphone devices are mere examples, and that the skilled person is able to design alternatives for obtaining the historical audio data without departing from the scope of the appended claims.

The processor 104 is configured to analyze the historical audio data 112, 122 of the microphone devices 110, 120. Audio analysis techniques, such as speech recognition, natural language processing, noise detection, pattern recognition, etc. for extracting information and meaning from audio signals are known in the art and will therefore not be discussed in detail. The processor 104 is further configured to identify differences between the historical audio data sets 112, 122 of the respective microphone devices 110, 120. These differences may for example relate to amounts of audio fragments of different types of audio received over the period of time.

The processor 104 is configured for assigning a priority level to at least one of the first and the second microphone device based on the differences between their respective historical audio data. The priority level may be indicative of a priority rule for a microphone device. The priority rule may for example be indicative of an order/sequence of analyzing future audio data from different microphone devices. The first microphone device 110 may, for example, be assigned a priority rule indicating a high priority and a second microphone device 120 may be assigned a priority rule indicating a low priority based on the differences of their historical audio data. Consequently, the future audio data of the first microphone device 110 may be analyzed before future audio data of the second microphone device 120 (e.g. by a central controlled of the distributed microphone system).

The priority level may be indicative of a communication rule for communicating future audio data from a microphone device via the network. The communication rule may be indicative of to a data sharing plan for the microphone device, the data sharing plan comprising instruction relating to the number, frequency, latency, quality and/or size of audio data/messages that are allowed to be communicated by the microphone device via the network. In embodiments, wherein the controller 100 is comprised in a central controller of the distributed microphone system, the controller 100 may communicate the communication rules to the microphone devices. In embodiments, wherein the controller 100 is comprised in a first microphone device 110 (see FIG. 2), the processor 104 may determine the communication rule for its own microphone device and subsequently communicate future audio data via the network accordingly. Additionally or alternatively, the processor 104 of the first microphone device 110 may determine a communication rule for the second microphone device 120 based on the differences between the historical audio data, and communicate the communication rule to the second microphone device 120, such that the second microphone device will communicate future audio data accordingly.

The processor 104 may for instance determine that the first historical audio data 112 comprises more spoken control commands (e.g. lighting control commands) compared to the second historical audio data 122. The processor 104 may further determine that the second historical audio data 122 comprises more background noise than the first historical audio data 112. A reason for these differences may be that the first microphone device 110 is located in a space near a controllable device, whereas the second audio device 120 is located in a corner of the space. As a result, the processor 104 may assign a higher priority value to the first microphone device 110 than the second microphone device 120. The priority level for the second microphone device 120 may, for example, indicate communication rules that limit the amount of future audio data from the second microphone device 120 that may be shared via the network. The number, frequency, quality and/or size of future audio data to be communicated from the second microphone device 120 via the network may for example be restricted. For example, the number of future audio data packets/messages may be limited, the frequency of communicating audio data (e.g. packets/messages) may be limited, the latency for communicating the audio data may be increased, the quality/size (e.g. bits per second) of the audio may be decreased, etc.

In another example, the processor 104 may determine that the first historical audio data 112 comprises more conversations (which may, for example, be used for inferring user activities or user profiles) compared to the second historical audio data 122. The processor 104 may further determine that the second historical audio data 122 comprises more wake words for triggering ("waking up") a voice-operated system, assistant or service (e.g. a voice-controlled digital assistant) and more device control commands comprising user questions/queries (e.g. "how heavy is the earth", "set a timer for 10 minutes", "add broccoli to my shopping list", etc.) than the first historical audio data 112. A reason for these differences may be that the first microphone device 110 is located in a common area in a space, whereas the second audio device 120 is located near a smart speaker that requires a wake word to be controlled. As a result, the processor 104 may assign a different priority level to the first microphone device 110 compared to the second microphone device 120. The priority level for the first microphone device 110 may, for example, indicate communication rules that limit the size of future audio data, as user profiling and/or detection of user activities may not be required in that area, and the priority level for the second microphone device 120 may indicate communication rules that allow the second microphone device 120 to share high-quality future audio data to improve detection of wake words and subsequent user questions/queries.

Figure 2:
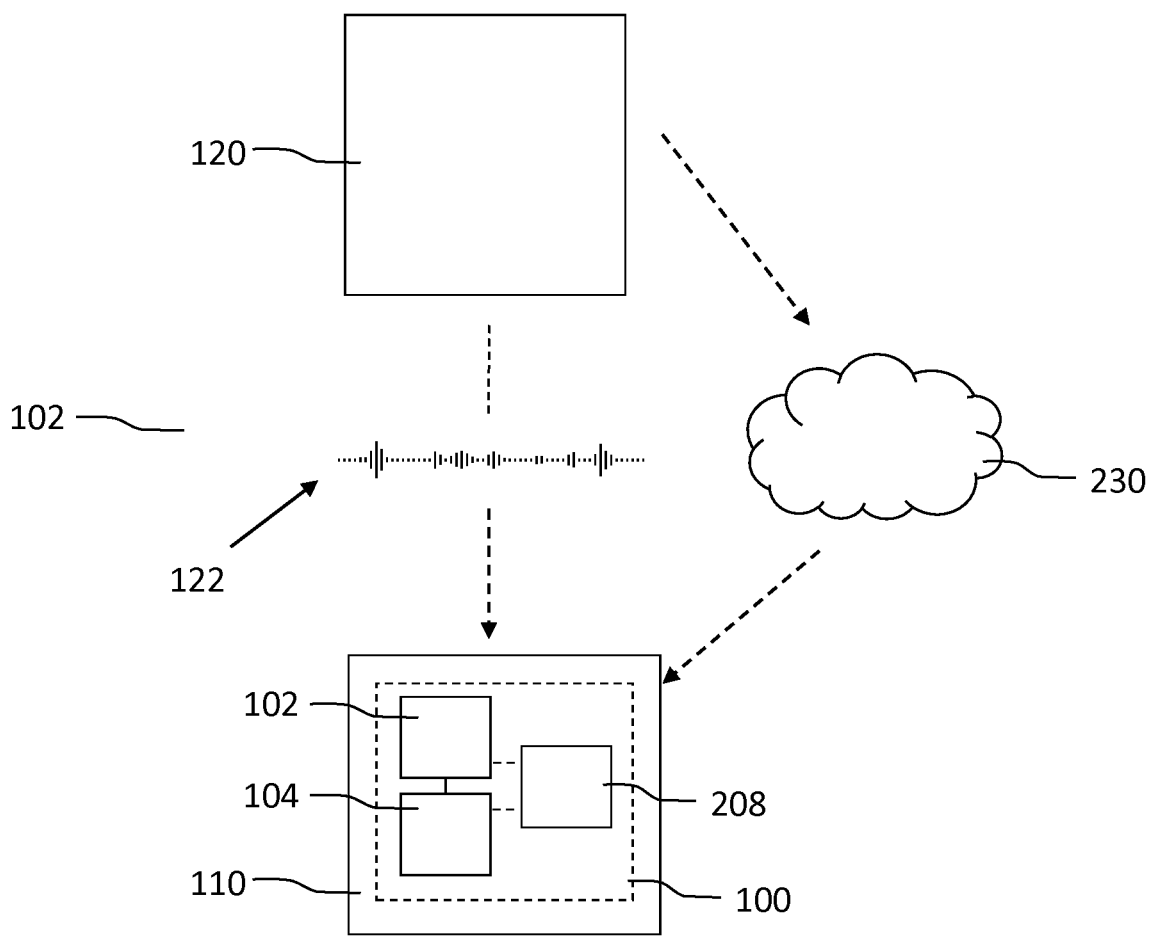
FIG. 2 shows schematically an embodiment of a plurality of microphone devices, wherein one microphone device comprises a controller for configuring one or more of the plurality of microphone devices.

FIG. 2 illustrates a distributed microphone system comprising a plurality of microphone devices 110, 120 and a controller 100 comprised in the first microphone device 110. The controller 100 comprises a communication module 102 configured to receive first historical audio data 112 from a microphone 208 of the first microphone device 110 and second historical audio data 122 from a second microphone device 120. The processor 104 may store the first historical audio data in an internal/external memory. The controller 100 further comprises a processor 104 configured to analyze the first historical audio data 112 and to analyze the second historical audio data 122. The processor 104 is further configured to compare the first historical audio data 112 to the second historical audio data 122 to identify differences between the first historical audio data 112 and the second historical audio data 122. The processor 104 is further configured to assign a priority level to the first microphone device 110 and/or a (different) priority level to the second microphone device 120 based on the differences. The processor 104 may determine a priority level for its own microphone device 110 and communicate the priority level to another microphone device or to a central controller of the distributed microphone system. Additionally or alternatively, the processor 104 of the first microphone device 110 may determine a priority level for the second microphone device 120 and communicate the priority level to the second microphone device 120 and/or to a central controller, via the network.

The processor 104 may be further configured to analyze the historical audio data 112, 122, to identify different types of audio in the audio data, and classify these different types of audio into sets of audio classes per respective microphone device. The processor 104 may further determine the priority levels of the respective microphone devices based on the presence of certain audio classes in the respective historical audio data and, optionally, based on how frequent certain audio classes occur in the respective historical audio data. Examples of audio classes include background noise/ambient noise (any sound other than the sound being monitored by the microphone devices), non-speech audio generated by people/users (e.g. footsteps, people coughing, doors opening/closing, typing sounds, etc.), non-speech audio generated by (building/outdoor) infrastructure (e.g. (subsonic) audio created by an HVAC system, by a power supply (e.g. from a lighting device co-located with the microphone device), etc.) background speech (speech not directed to a voice-controlled system or service, for example speech directed to people present in the same space or people virtually present), voice commands for controlling voice-controlled devices, voice commands for requesting voice-controlled services (e.g. user questions/queries which may be answered by a voice-controlled service), wake words for triggering voice-operated systems, assistants or services, etc. The processor 104 may, for example, analyze first audio data 112 of the first microphone device 110 and second audio data 122 of the second microphone device 120, and determine that the first audio data 112 comprises only background noises and/or background speech, whereas the second audio data 122 comprises voice commands for controlling voice-controlled devices and/or voice commands for requesting voice-controlled services. Based on this determination, the processor 104 may set a higher priority level for the second microphone device 120 and a lower priority level for the first microphone device 110.

A microphone device may record audio that originates from the space wherein it is located, but also audio that originates from, for example, an adjacent space. The processor 104 may be further configured to discriminate between audio that originates from a first source in a first space, and audio that originates from a second source in a second space adjacent to the first the based on the characteristics of the historical audio data of a single microphone device. The processor 104 may be configured to neglect the audio from the second space when determining the priority level for that microphone device. Alternatively, the processor 104 may determine the priority level for the microphone device based on a ratio between the audio from the first source and the audio from the second source. If, for instance, only/mostly audio from the second space is present in the historical audio data, a lower priority level may be assigned to the microphone device, and vice versa.

The processor 104 may be further configured to determine that an audio fragment recorded by the first microphone device 110 originates from the same source as an audio fragment recorded by the second microphone device 120 if the audio fragment is recorded by both microphone devices at a same moment in time and if there is a sufficient level of similarities between the audio fragment. The processor 104 may then store a correlation between both audio fragments, indicating that the audio fragments originate from the same source. The processor 104 may, for example, determine that a voice command recorded at the first microphone device is the same voice command that was recorded by a second microphone device at the same (historical) moment in time.

Figure 3A:
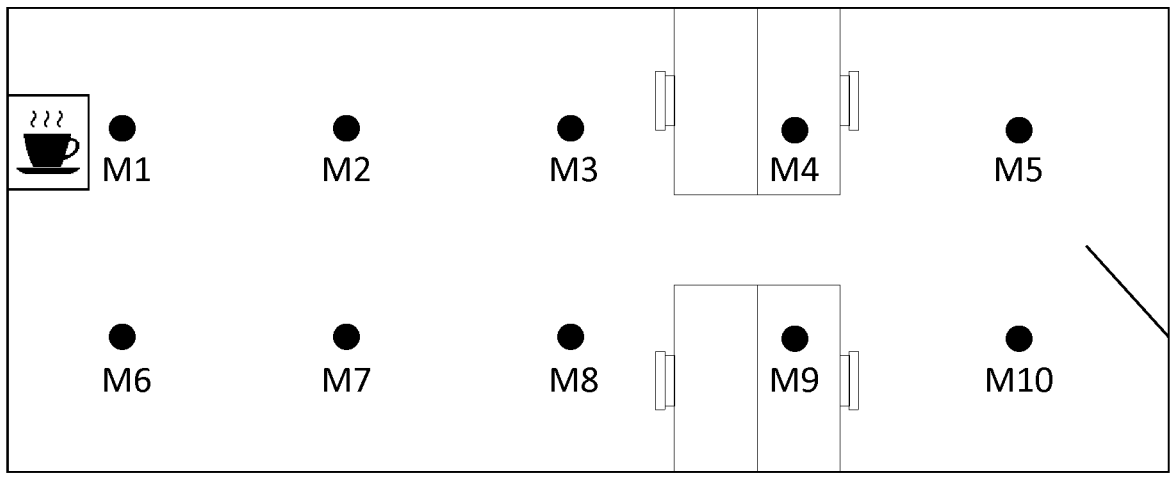
FIG. 3*a* shows schematically a top view of a distributed microphone system comprising a plurality of microphone devices.
Figure 3B:
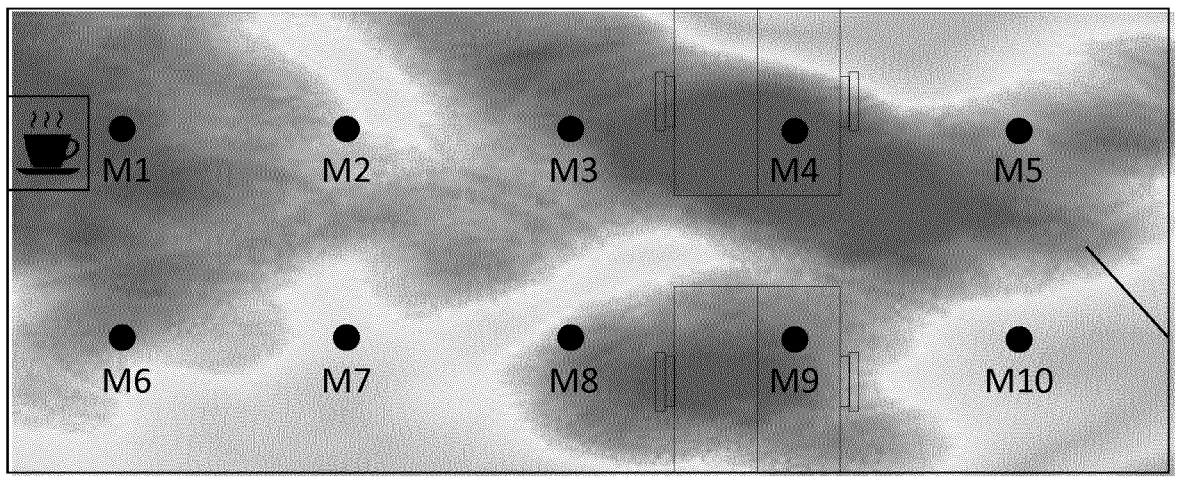
FIG. 3*b* shows schematically a heat map of a first type of historical audio data of the distributed microphone system of FIG. 3*a;*
Figure 3C:
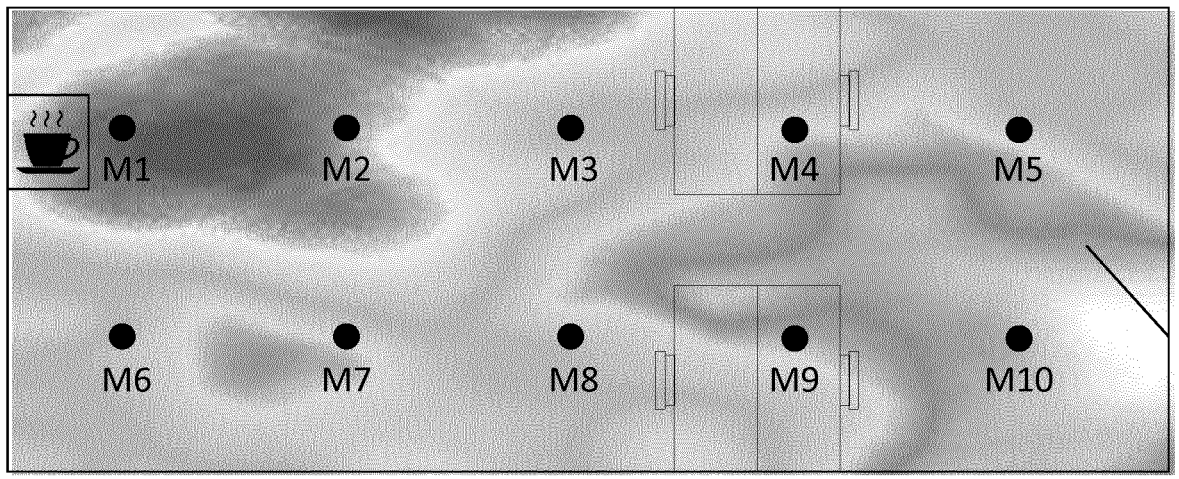

FIG. 3a illustrates an example of a distributed microphone system comprising a plurality of microphone devices M1-M10 in a space. FIG. 3a further illustrates a coffee machine (next to M1), two sets of tables (at M4 and M9) and a door (next to M10). FIG. 3b illustrates the system of 3a and a heat map indicating a first type of audio that has been detected by the plurality of microphone devices M1-M10 over a period of time, wherein the darker areas indicate a higher number of detections of the first type of audio over the period of time. FIG. 3c illustrates the system of 3a and a heat map indicating a second type of audio that has been detected by the plurality of microphone devices M1-M10 over a period of time, wherein the darker areas indicate a number level of detections of the second type of audio over the period of time. The first type of audio may, for example, be background speech by users. The processor 104 may determine the amount of background speech at each microphone. This has been visualized as a heat map in FIG. 3b. The second type of audio may, for example, be control commands for voice-controlled devices users. The processor 104 may determine the amount of control commands at each microphone. This has been visualized as a heat map in FIG. 3c. In these examples, the processor 104 may assign lowest priority levels to microphone devices M7 and M10, as these microphones rarely record any audio of the first or second type. The processor 104 may further assign high priority levels to microphone devices M1 and M2, because these have recorded high amounts of control commands (likely for controlling the coffee machine). Also, it is important to distinguish between background speech (see FIG. 3b) and control commands (see FIG. 3c), which may be another reason to assign higher priority levels to microphone devices M1 and M2. The processor 104 may further assign medium priority levels to the remaining microphone devices because they don't receive control commands but merely background speech (at the entrance, the coffee machine and at the tables). Alternatively, for instance in an embodiment wherein background speech is irrelevant, the processor 104 may assign a low priority level to the remaining microphone devices as well. The processor 104 may be configured to generate heat maps, which may be used for communicating the detected types of audio to users.

The processor 104 may be configured to determine the priority level for a microphone device based on the presence of users. The processor 104 may analyze the historical audio data of the first and second microphone devices to determine levels of user presence at the respective microphone devices (e.g. how often users are present, how long user stay within detection range of the microphone device, etc.). The processor 104 may then determine the respective priority levels based on the respective levels of user presence. If, for example, more users have been present at the first microphone device 110 compared to the second microphone device 120 during the time period during which the historical audio data has been recorded, the processor 104 may assign a higher priority level to the first microphone device 110.

The processor 104 may be further configured to determine the priority level for a microphone device based on the locations of one or more users relative to the plurality of microphone devices 110, 120. The processor 104 may be further configured to determine the locations of users relative to the plurality of microphone devices 110, 120, by comparing the intensity of user sounds that have been detected at the same moment in time. Determining differences in intensity between user-generated sounds captured at two microphone devices may be sufficient to determine/estimate to which microphone device the user was closest. The processor 104 may then assign priority levels to the microphone devices based thereon. If, for example, more users were located closer to the first microphone device 110 compared to the second microphone device 120 during the time period during which the historical audio data has been recorded, the processor 104 may assign a higher priority level to the first microphone device 110. Additionally, the processor 104 may be configured for receiving information indicative of (predefined) locations of the plurality of microphones relative to the space wherein they are located. This information may, for example, be obtained from an indoor positioning system, from a building information model, from the microphone devices, etc. When three or more microphone devices detect the same user-generated sound, trilateration techniques—which are known in the art—can be used to determine a more precise location of the user that created that sound.

The processor 104 may be further configured to determine one or more trajectories of one or more users over time relative to at least three microphone devices based on the historical audio data of these microphone devices. The audio data of the plurality of microphones may be analyzed to identify similar sounds (e.g. footsteps, a user's voice, etc.) to determine that they originate from the same user. By applying trilateration to these audio fragments, a position of the user can be determined at a moment in time. If this position changes over time, it is indicative of that the user is moving. This enables detection of the trajectory (and the speed) of a user. The trajectories of multiple users may be detected over the period of time during which the historical audio data has been recorded. The processor 104 may be further configured to assign the priority level to the microphone devices based on the one or more trajectories of the one or more users. Microphone devices located at a location/path that has been traversed less frequent by one or more users may, for example, be assigned lower priority levels than microphone devices located at a location/path that has been traversed by one or more users.

The processor 104 may be further configured to determine the priority level for a microphone device based on the microphone device's location. The processor 104 may be configured to obtain the locations of the first and second microphone devices 110, 120, for example from an (indoor) positioning system, or by accessing a database comprising information about the locations of the microphone devices 110, 120. The locations may, for example, be defined as coordinates in a space. Additionally or alternatively, the locations may be defined semantically, for instance indicating a type of room, area or space where the respective microphone device has been installed (e.g. "living room", "doorway", "open office space 1", "intersection", "sidewalk", etc.). If, for example, a microphone device is located in a corner of a room, it may be assigned a lower priority than a microphone device located in the center of a room.

The processor 104 may be further configured to determine the priority level for a microphone device based on an intended/predefined functionality of the microphone device. The processor 104 may be configured to obtain information indicative of the intended/predefined functionality of the plurality of microphone devices 110, 120. This information may be obtained from the microphone devices, form a central home/office/central control system, from a software application running on a mobile device, etc. A functionality of a first microphone device 110 may, for example, be to detect control commands for a device (e.g. a lamp, a vending machine, etc.). A functionality of a second microphone device 120 may be presence detection based on user generated sounds. The processor 104 may obtain these functionalities and assign a first priority level to the first microphone device 110, instructing the first microphone device 110 to share high quality audio in order to properly identify the control commands, and assign a second priority level to the second microphone device 120, instructing the second microphone device 120 to share low quality audio, because high-quality audio is not necessary for determining user presence.

The processor 104 may be further configured to determine the priority level for a microphone device based on user activities detected at the respective microphone devices 110, 120. The processor 104 may analyze the historical audio data and retrieve user activities therefrom, for instance based on conversations between users, or based on other auditory types such as music, non-speech audio generated by users, etc. The processor 104 may analyze the historical audio data and use Natural Language Processing techniques to identify user activities (e.g. chit-chatting, a business meeting conversation, a dinner conversation, etc.), or the processor 104 may detect non-speech sound (e.g. typing sound indicative of a person working on his computer, movie sounds indicative of a person watching a movie, music indicative of a person listening to music,), etc. Based on the activities detected at the respective microphone devices, the processor 104 may determine a priority level. If, for example, more activities that require more audio detection, communication and/or analysis have been identified at the first microphone device 110 compared to the second microphone device 120 during the time period during which the historical audio data has been recorded, the processor 104 may assign a higher priority level to the first microphone device 110.

The processor 104 may be further configured to dynamically update the priority levels of the microphone devices 110, 120. The processor 104 may continuously or periodically analyze historical and current audio data to update the priority levels. The processor 104 may be further configured to receive a presence signal from a presence sensor associated with one or more microphone devices. The presence signal is indicative of presence of a user. The presence sensor may be part of the distributed microphone system. The presence sensor may for instance be a camera, a PIR sensor, a radar/RF sensor, etc. for generating the sensor signal when a person is present. The presence sensor may be co-located with the microphone devices (e.g. comprised in the same device, for instance in a lighting fixture). Alternatively, the presence sensor may be located in the same area as its associated microphone device. The processor 104 may be configured to update or (temporarily) overrule a previous priority level when the presence signal has been received. If, for example, a user enters a room, a presence sensor may detect the user's presence and increase the priority level of a microphone device located in the room based on the user's presence. Optionally, the processor 104 may switch back to a previous priority level after a period of time, for instance when presence is no longer detected or after a time-out period.

The processor 104 may be further configured to (temporarily) adjust the priority level of a microphone device based on a network capacity (e.g. the bandwidth of the network, the network load, download speed of the network, etc.) and/or a network utilization relative to a predetermined network capacity. The processor 104 may be configured to receive an indication of the network capacity of the network (e.g. from a central controller, a central server, a network router, etc.), and adjust/overrule the priority level (e.g. the communication rules) based thereon. In an example, the current network utilization may be low, and therefore the processor 104 may adjust the priority level of a microphone device, allowing the microphone device to increase the number, frequency, quality and/or size of audio data to be communicated via the network.

A processing unit of a microphone device may be configured to (temporarily) adjust/overrule its priority level. The processing unit may, for example, be configured to locally process the audio data, retrieve/detect an audio event, for example a specific audio class or a spoken user input, from current audio data and determine to overrule the priority level based on the audio event. This may, for example, enable the microphone device to communicate audio data (e.g. information indicative of the audio event) to a central controller, even though the central controller may have assigned a low priority level to that microphone device.

Figure 4:
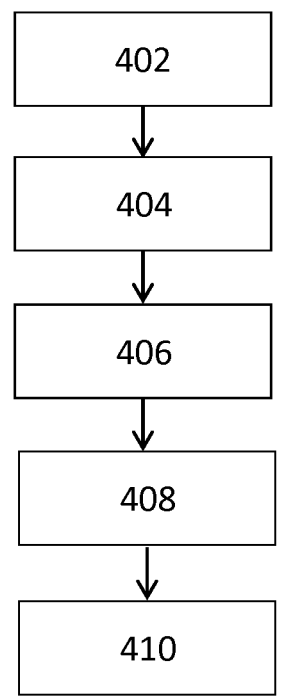
* and FIG. 4 shows schematically a method of configuring a method for configuring a distributed microphone system comprising a plurality of microphone devices connected via a network.

FIG. 4 shows steps of a method 400 for configuring a distributed microphone system comprising a plurality of microphone devices 110, 120 connected via a network. The method comprises analyzing 402 first historical audio data 112 received from a first microphone device 110 of the plurality of microphone devices and analyzing 404 second historical audio data 122 received from a second microphone device 120 of the plurality of microphone devices. The method further comprises comparing 406 the first historical audio data 112 to the second historical audio data 122 to identify 408 differences between the first historical audio data 112 and the second historical audio data 122. The method further comprises assigning 410 a priority level to the first and/or second microphone device based on the differences between the first historical audio data and the second historical audio data, wherein the priority level is indicative of a priority rule for analyzing future audio data recorded by the first and/or second microphone device, respectively, and/or wherein the priority level is indicative of a communication rule for communicating future audio data from the first and/or second microphone device, respectively, via the network.

The method 400 may be executed by computer program code of a computer program product when the computer program product is run on a processing unit of a computing device, such as the processor 104 of the controller 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method for configuring a distributed microphone system comprising a plurality of microphone devices connected via a network, the method comprising:
   analyzing first historical audio data received from a first microphone device of the plurality of microphone devices to identify different types of audio in the first historical audio data,
   analyzing second historical audio data received from a second microphone device of the plurality of microphone devices to identify different types of audio in the second historical audio data,
   comparing the first historical audio data to the second historical audio data to identify differences between the first historical audio data and the second historical audio data,
   determining locations of the first and second microphone devices based on the first and second historical audio data, respectively, and
   assigning a priority level to the first and/or second microphone device based on the differences between the first historical audio data and the second historical audio data and adjusting the priority level to the first and/or second microphone device further based on the respective locations of the first and second microphone devices, wherein the priority level is indicative of a priority rule for analyzing future audio data recorded by the first and/or second microphone device, respectively, and/or wherein the priority level is indicative of a communication rule for communicating future audio data from the first and/or second microphone device, respectively, via the network.

2. The method of claim 1, wherein the communication rule defines an allowed number, frequency, latency, quality and/or size of audio data to be communicated from the respective microphone device via the network.

3. The method of claim 1, wherein the method further comprises:
   classifying different types of audio of the first historical audio data into a first set of one or more audio classes, and
   classifying different types of audio of the second historical audio data into a second set of one or more audio classes,
   wherein the assigning of the priority level to the first and/or second microphone device is further based on the first set of audio classes and the second set of audio classes, respectively.

4. The method of claim 3, wherein the audio classes comprise:
   background noise,
   non-speech audio generated by a user,
   non-speech audio generated by infrastructure,
   background speech,
   voice commands for controlling voice-controlled devices,
   voice commands for requesting voice-controlled services, and/or
   wake words for triggering voice-operated systems, assistants or services.

5. The method of claim 1, wherein the step of analyzing the first historical audio data comprises analyzing the first historical audio data to identify a first level of user presence, and wherein the step of analyzing the second historical audio data comprises analyzing the second historical audio data to identify a second level of user presence and wherein the assigning of the priority level to the first and/or second microphone device is further based on the first and second levels of user presence.

6. The method of claim 5, further comprising:
   determining one or more locations of one or more users relative to the first, second and a third microphone device based on the first, second and third historical audio data, and
   assigning the priority level to the first, second and/or third microphone device further based on the locations of the users relative to the first, second and third microphone devices.

7. The method of claim 6, further comprising:
determining one or more trajectories of one or more users over time relative to the first, second and third microphone devices based on the locations of the one or more users over time,
assigning the priority level to the first, second and/or third microphone device further based on the one or more trajectories of the one or more users.

8. The method of claim 1, further comprising:
receiving a presence signal from a presence sensor associated with the first and/or the second microphone device, and
adjusting the priority level of the first and/or the second microphone device, respectively, in response to the presence signal.

9. A non-transitory computer readable medium comprising at least one software code portion, the software code portion being configured to cause a computing device to perform the method of claim 1 when run on a processing unit of the computing device.

10. A controller for configuring a distributed microphone system comprising a plurality of microphone devices connected via a network, the controller comprising:
a communication module configured to receive first historical audio data from a first microphone device of the plurality of microphone devices, and to receive second historical audio data from a second microphone device of the plurality of microphone devices, and
a processor configured to analyze the first historical audio data to identify different types of audio in the first historical audio data, analyze second historical audio data to identify different types of audio in the second historical audio data, compare the first historical audio data to the second historical audio data to identify differences between the first historical audio data and the second historical audio data, assign a priority level to the first and/or second microphone device based on the differences between the first historical audio data and the second historical audio data, determine locations of the first and second microphone devices based on the first and second historical audio data, respectively, and adjust the priority level to the first and/or second microphone device further based on the respective locations of the first and second microphone devices, wherein the priority level is indicative of a priority rule for analyzing future audio data recorded by the first and/or second microphone device, respectively, and/or wherein the priority level is indicative of a communication rule for communicating future audio data from the first and/or second microphone device, respectively, via the network.

11. The controller of claim 10, wherein the controller is comprised in the first microphone device, and wherein the communication module is configured to receive the first historical audio data from a microphone comprised in the first microphone device.

12. A system comprising:
a central controller comprising the controller of claim 10,
the first microphone device configured to communicate the first historical audio data to the central controller, and
the second microphone device configured to communicate the second historical audio data to the central controller.

13. The system of claim 12, wherein the system is a lighting system, and wherein the first microphone device and the second microphone device are comprised in a first lighting device of the lighting system and a second lighting device of the lighting system, respectively.

* * * * *